(No Model.)

S. H. STUPAKOFF.
GUARD RAIL.

No. 482,766.  Patented Sept. 20, 1892.

WITNESSES:
Warren H. Swartz
H. M. Corwin

INVENTOR
Simon H. Stupakoff
BY
W. Bakewell Sons
ATTORNEYS

UNITED STATES PATENT OFFICE.

SIMON H. STUPAKOFF, OF PITTSBURG, PENNSYLVANIA, ASSIGNOR TO CHARLES H. READ, OF SAME PLACE.

GUARD-RAIL.

SPECIFICATION forming part of Letters Patent No. 482,766, dated September 20, 1892.

Application filed March 16, 1892. Serial No. 425,174. (No model.)

*To all whom it may concern:*

Be it known that I, SIMON H. STUPAKOFF, of Pittsburg, in the county of Allegheny and State of Pennsylvania, have invented a new and useful Improvement in Guard-Rails, of which the following is a full, clear, and exact description, reference being had to the accompanying drawings, forming part of this specification, in which—

Figure 1:
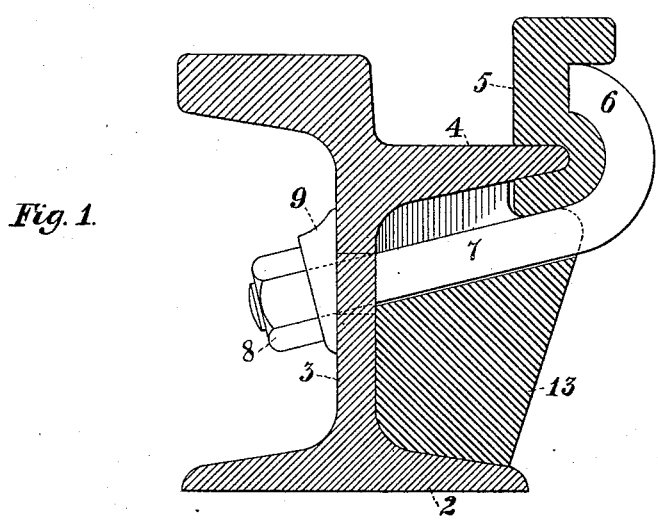
Figure 2:
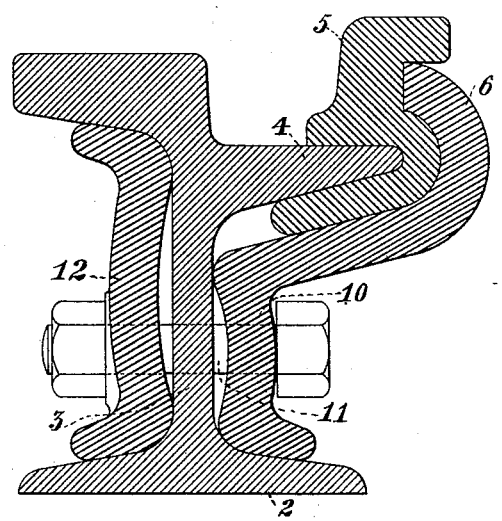

Figure 1 is a cross-sectional view of a street-railway rail provided with my improved guard, and Fig. 2 is a similar view showing the form which my guard takes at the rail-joint.

My invention relates to that class of rails employed in curved portions of the street-railway track, and wherein rails of a special character, termed "guard-rails," are necessary to prevent the car from leaving the rails. The guard portion of these rails has heretofore been made separable to allow the removal and replacing of the same when worn; but the guard and its attachments have heretofore been cumbersome, costly, and difficult of manufacture and application.

My invention is designed to make the guard and its fastening much lighter, neater, and cheaper than heretofore; and it consists in a guard having a recess upon the inner side of its lower portion to receive the flange of the rail, and also a recess upon its outer side to receive the hooked end of a clamp, which holds the guard firmly in place.

In the drawings, 2 indicates the base of the rail, having the web 3 and the inner flange 4. In Fig. 1 the outer part of this flange or tram fits into a longitudinal recess in the inner side of the guard 5, which is securely held in place by the hooked end 6 of a bolt 7, which passes through the web of the rail and is provided with a nut 8, which bears upon the inclined face of a washer or boss 9, bearing against the web. The lower portion of the guard is suitably curved upon its outer side to furnish above the same a seat for the hook 6, which terminates in a recess formed between the lower curved portion and the head of the guard. A cast-iron block 13 is employed to aid in supporting the guard and hooked bolt, this block having a longitudinal shoulder upon which the guard rests, and a slot extending downwardly therefrom, in which slot the bolt rests. In assembling the parts the block 13 is first put in place, then the guard slid onto the shoulder of the block and over the edge of the flange, and the bolt is then inserted and drawn tight. It is evident that this block greatly strengthens and stiffens the guard-rail and gives it a much longer life.

In the form of Fig. 2 the hook forms an integral extension of the inner splice-bar 10, which is held in place by the bolt 11, passing through a second brace-plate or splice-bar 12 upon the outer side of the rail. This form is particularly adapted for use at the joints of the rails, the hook being combined with the splice-bar and the portion of the guard beneath the tram extended to rest upon the hooked portion. It will be understood that the integral hooks may be in the form of a continuous flange extending from the splice-bar or in the form of separated bars or strips bent into hook form and taking into separate recesses in the outer side of the guard.

The advantages of my construction are obvious. The guard acts as perfectly as in former constructions, being removed when worn and a new guard inserted, while it is much simpler, cheaper, and lighter than in such constructions.

It is apparent that many changes may be made in the form of the guard and the manner of attaching it to the rail, since

What I claim is—

1. A rail provided with a removable guard and a hook arranged to hold said guard in place, substantially as described.

2. A rail provided with a guard fitting over its inner flange or tram and a hook secured to the rail and taking into a recess in the outer side of the guard, substantially as described.

3. A rail provided with a removable guard fitting upon its tram and a bolt passing through the web of the rail and provided with a hook engaging said guard, substantially as described.

4. A rail provided with a removable guard fitting upon its tram and a bolt having a nut bearing upon an inclined surface and having its end bent into a hook which engages the guard, substantially as described.

5. A rail provided with a block fitted between its flange and base, a removable guard fitting over the tram of the rail and resting upon a shoulder of the block, and a hooked bolt engaging the guard and passing through a slot in the block, substantially as described.

In testimony whereof I have hereunto set my hand this 10th day of March, A. D. 1892.

SIMON H. STUPAKOFF.

Witnesses:
W. B. CORWIN,
C. BYRNES.